J. E. TAYLOR.
TIRE SHOE OR CASING.
APPLICATION FILED SEPT. 11, 1916.
1,271,388.
Patented July 2, 1918.
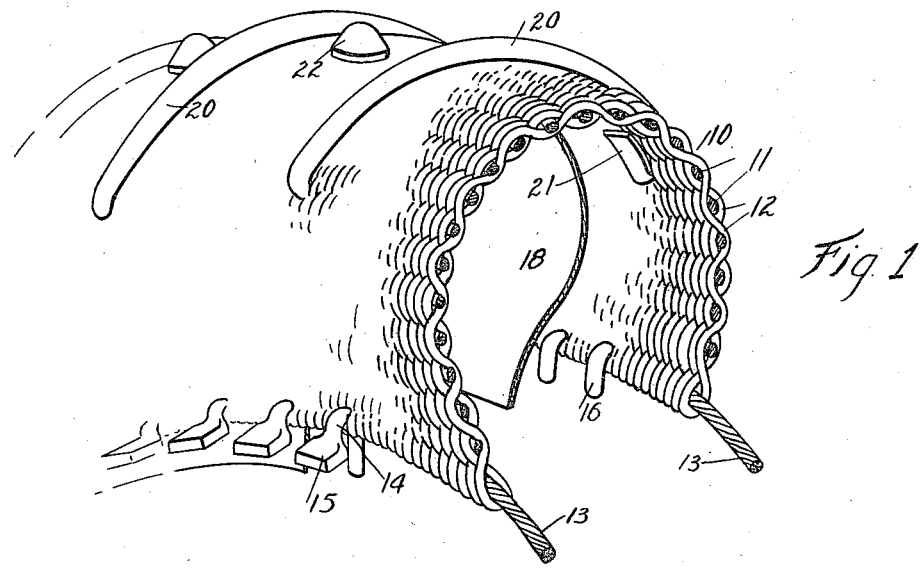
Fig. 1
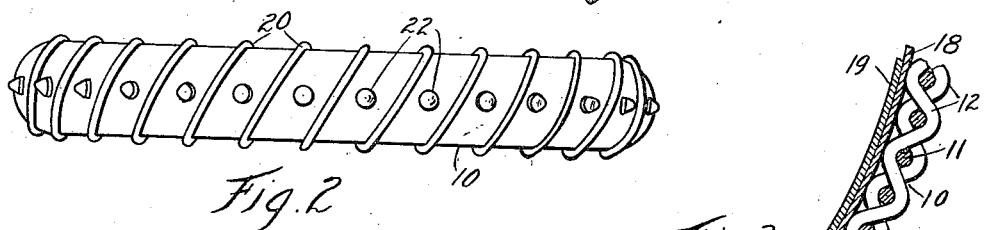
Fig. 2
Fig. 3
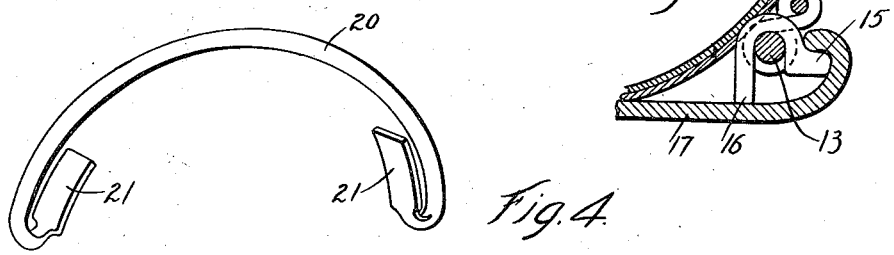
Fig. 4
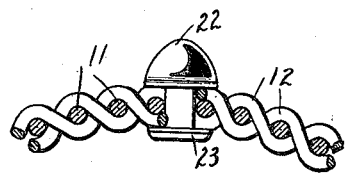
Fig. 5
Inventor
J. E. Taylor.
by
Hull Smith Brock & West
Attys.

UNITED STATES PATENT OFFICE.

JACK E. TAYLOR, OF CLEVELAND, OHIO.

TIRE SHOE OR CASING.

1,271,388.        Specification of Letters Patent.     Patented July 2, 1918.

Application filed September 11, 1916. Serial No. 119,330.

*To all whom it may concern:*

Be it known that I, JACK E. TAYLOR, a citizen of the United States, residing at Cleveland, in the county of Cuyahoga and State of Ohio, have invented a certain new and useful Improvement in Tire Shoes or Casings, of which the following is a full, clear, and exact description, reference being had to the accompanying drawings.

This invention relates generally to tires, and more particularly to a resilient tire for use on automobiles, and is especially designed for auto trucks and heavy load-carrying vehicles.

The object of the invention is to provide a metallic tire casing or shoe which will be puncture proof and will still have sufficient flexibility to yield readily with the inner pneumatic tube; and a still further object is to provide a metallic tire casing or shoe with anti-skidding and road-gripping appliances whereby the tractive quality of the tire is materially increased.

With these various objects in view the invention consists in the novel features of construction and arrangement of parts hereinafter more fully described and pointed out in the claims.

In the drawings forming a part of this specification, Figure 1 is a perspective view illustrating a portion of a tire shoe or casing constructed in accordance with my invention; Fig. 2 is an edge view of the casing; Fig. 3 is a detail sectional view illustrating the manner of connecting the casing to the rim; Fig. 4 is a detail perspective view of one of the anti-skidding devices and Fig. 5 is a detail view illustrating the manner of connecting the traction buttons to the casing.

In carrying out my invention I provide a casing 10 of the size desired, said casing being made entirely of flexible metal strands preferably woven together as shown and comprising longitudinal strands 11 and transverse strands 12, the transverse strands being woven around endless wire cables 13 and thereby providing a selvage edge for the fabric, and a bead for the casing.

In connection with this metallic woven fabric casing or shoe I employ hooks 14 for the purpose of connecting the shoe or casing to the tire rim, these hooks 14 comprising flat horizontal outer members 15 and the round vertical members 16, the member 15 being adapted to engage the flange of the tire rim 17, while the vertical member bears upon the base thereof. A liner 18 of canvas or other suitable material is employed between the metallic casing or shoe 10 and the pneumatic inner tube 19 in order to protect the inner tube against wear by coming into contact with metallic parts.

It is obvious that any other form or pattern of weave could be employed so long as the metallic fabric is connected to the endless wire cables which not only serve to give the proper bead but also provide a strong anchorage connection for the engaging hooks and thereby take all of the strain from the fabric casing itself.

For the purpose of increasing the traction of the casing or shoe I preferably employ the exterior traction elements 20 having their ends 21 bent back and flattened, these hooked ends 21 passing through the woven fabric and resting against the inner face of the same, but being flattened they do not materially disturb the smooth continuity of the inner face of the shoe. These traction elements are made of steel, of suitable size and are curved to correspond with the ultimate shape of the casing or shoe when the tire is inflated, and if preferred I may employ in addition to the transverse traction elements a plurality of lugs or studs 22 passed through the fabric along the longitudinal center of the same and riveted securely upon the inner side thereof as indicated at 23.

In practice the traction elements 20 may be arranged at any angle to the longitudinal axis of the shoe but are preferably arranged obliquely thereto and in parallel order.

A tire shoe constructed as herein shown and described is quickly and easily connected to a tire rim as it is only necessary to insert the ends 15 of the hooks 14 beneath the flanges of the rim and inflate the tire, and as the inflation proceeds the hooks are crowded into their proper positions bringing the ends 16 firmly into contact with the base of the rim and securely uniting the rim and shoe. The metallic fabric being closely woven is puncture proof and the smooth fabric liner between the inner tube and casing provides ample protection for the inner tube against friction with any of the metallic parts. The transversely arranged traction elements prevent skidding and at the same time materially increase the tractive quality of the tire as a whole, and this quality is further increased by the employment, when desired, of the studs or lugs,

Having thus described my invention, what I claim is:—

1. A tire casing or shoe comprising endless cables, a woven metallic fabric connected to said cables, and hooks passing through said fabric and over said cables, said hooks being adapted to bear on the base of the rim and to engage the rim flanges.

2. In a tire casing or outer shoe, for attachment to a tire rim, the combination of a woven metallic fabric, a pair of endless cables passing through the edges of said fabric and a plurality of angle attaching members carried by said cables and turning freely thereon, one end of each of said members being adapted to engage the base of the rim and the other end being adapted to engage the rim flange.

3. In a tire casing or outer shoe for attachment to a tire rim the combination of a fabric, a pair of cables passing through the edges of said fabric, and a plurality of angle attaching members carried by said cables and turning freely thereon, one end of each of said members being adapted to engage the base of the rim and bear endwise thereon and the other end being bent at substantially right angles thereto and adapted to engage the rim flange.

In testimony whereof I hereunto affix my signature.

JACK E. TAYLOR.